(12) United States Patent
Toland (10) Patent No.: US 9,737,136 B1
(45) Date of Patent: Aug. 22, 2017

(54) OVERHEAD SUPPORT FOR VIEWING MEDIA

(71) Applicant: Jonathan Toland, Portland, OR (US)

(72) Inventor: Jonathan Toland, Portland, OR (US)

(*) Notice: Subject to any disclaimer, the term of this patent is extended or adjusted under 35 U.S.C. 154(b) by 167 days.

(21) Appl. No.: 14/702,058

(22) Filed: May 1, 2015

(51) Int. Cl.
| | | |
|---|---|---|
| *B42D 17/00* | (2006.01) | |
| *A47B 23/00* | (2006.01) | |
| *F16M 13/02* | (2006.01) | |
| *A47B 23/06* | (2006.01) | |
| *A47B 23/04* | (2006.01) | |
| *G02B 27/02* | (2006.01) | |

(52) U.S. Cl.
CPC ............ *A47B 23/007* (2013.01); *A47B 23/04* (2013.01); *A47B 23/06* (2013.01); *F16M 13/022* (2013.01); *F16M 13/027* (2013.01); *G02B 27/021* (2013.01); *G02B 27/028* (2013.01); *A47B 2023/008* (2013.01)

(58) Field of Classification Search
CPC . A47B 23/007; A47B 2023/008; A47B 23/04; A47B 23/06; F16M 13/027; F16M 13/022; G02B 27/021; G02B 27/025; G02B 27/02; G02B 27/027; G02B 27/028
USPC ........... 359/804, 806, 807; 211/117; 108/149
See application file for complete search history.

(56) References Cited

U.S. PATENT DOCUMENTS

| | | | | | |
|---|---|---|---|---|---|
| 2,604,009 | A | * | 7/1952 | Walrath | ............ G01B 9/00 359/806 |
| 2,908,465 | A | * | 10/1959 | Lykes | ............ A47B 23/007 248/445 |
| 3,894,709 | A | * | 7/1975 | Weir | ............ A47B 23/007 108/49 |
| 4,294,425 | A | * | 10/1981 | Weber | ............ A47B 23/007 248/328 |
| 4,379,618 | A | * | 4/1983 | Tall | ............ G02B 25/002 359/804 |
| 4,974,523 | A | * | 12/1990 | Giarratana | ............ A47B 43/006 108/42 |

FOREIGN PATENT DOCUMENTS

DE          10156630          *   5/2003   ............ A47B 23/007

OTHER PUBLICATIONS

Translation of DE10156630, 2003.*

* cited by examiner

*Primary Examiner* — Jordan Schwartz
*Assistant Examiner* — George G King
(74) *Attorney, Agent, or Firm* — Kintner IP, LLC; Mary Frances Ludwig (57) ABSTRACT

An overhead support includes a transparent structure to support a visual medium for display to a supine viewer. The support is suspended from a ceiling over a location where the viewer wishes to recline. The support includes a positioning mechanism for easily adjusting the height of the visual medium above the viewer. In an embodiment, the positioning mechanism has a lock for fixing the height. In another embodiment, the support includes a light source. In another embodiment, the support includes an optical prescription.

4 Claims, 6 Drawing Sheets

OVERHEAD SUPPORT FOR VIEWING MEDIA

CROSS REFERENCE TO RELATED APPLICATION

NONE

TECHNICAL FIELD

The present invention pertains generally to supports, and more particularly to an overhead support for a visual medium.

BACKGROUND OF THE INVENTION

Viewers who view visual media, such as a book, while in a supine position often suffer discomfort, such as muscle strain or numbness, from supporting the media in hand and overhead. In addition, the viewer's eyes must frequently refocus to adjust to movements of the media held in hand. This process causes fatigue and eye-strain, creating an unpleasant viewing experience.

BRIEF SUMMARY OF THE INVENTION

The present invention is directed to an overhead support for a visual medium which increases a viewer's comfort and enjoyment of viewing media while in a supine position. The present invention utilizes a transparent structure to support the visual medium, which may be a printed material or small electronic device. The support is suspended from a ceiling over a location where the viewer wishes to recline, such as over a bed. The support includes a positioning mechanism for easily adjusting the height of the visual medium above the viewer. These features provide the benefit of a fixed focal distance for comfortable viewing while eliminating the need for the person viewing the media to support the media. This device is of great benefit to viewers with physical limitations or those confined to bed.

In accordance with an embodiment of the overhead support, the support has a transparent support structure, an upwardly projecting hanger affixed to the support structure, and a positioning mechanism connected between the hanger and a ceiling anchor, whereby the height of the support structure above the viewer is adjustable.

In accordance with another embodiment, the positioning mechanism has a lock for fixing the height of the support structure above the viewer.

In accordance with another embodiment, the support structure has a width and the ceiling anchor is offset from a wall by a distance less than half of the width so that said near end contacts the wall, thereby positioning the support structure at an inclination. In an embodiment, a bumper is disposed on one end of the structure.

In accordance with another embodiment, the hanger is u-shaped.

In accordance with another embodiment, a light source is affixed to the support structure and positioned to illuminate the visual medium.

In accordance with another embodiment, a portion of the support structure has an optical prescription, so that the viewer views a magnified image of the visual medium.

Other embodiments, in addition to the embodiments enumerated above, will become apparent from the following detailed description, taken in conjunction with the accompanying drawings, which illustrate, by way of example, the principles of the device and method of use.

LIST OF DRAWING REFERENCE NUMERALS

20 overhead support
  22 support structure
    24 near end
    26 far end
  30 hanger
  40 positioning mechanism
    42 distal end
    44 proximal end
    46 lock
  50 bumper
  60 light source
500 visual medium
600 ceiling
610 anchor
620 joist
700 wall
800 nut

DETAILED DESCRIPTION OF THE INVENTION

Figure 1:
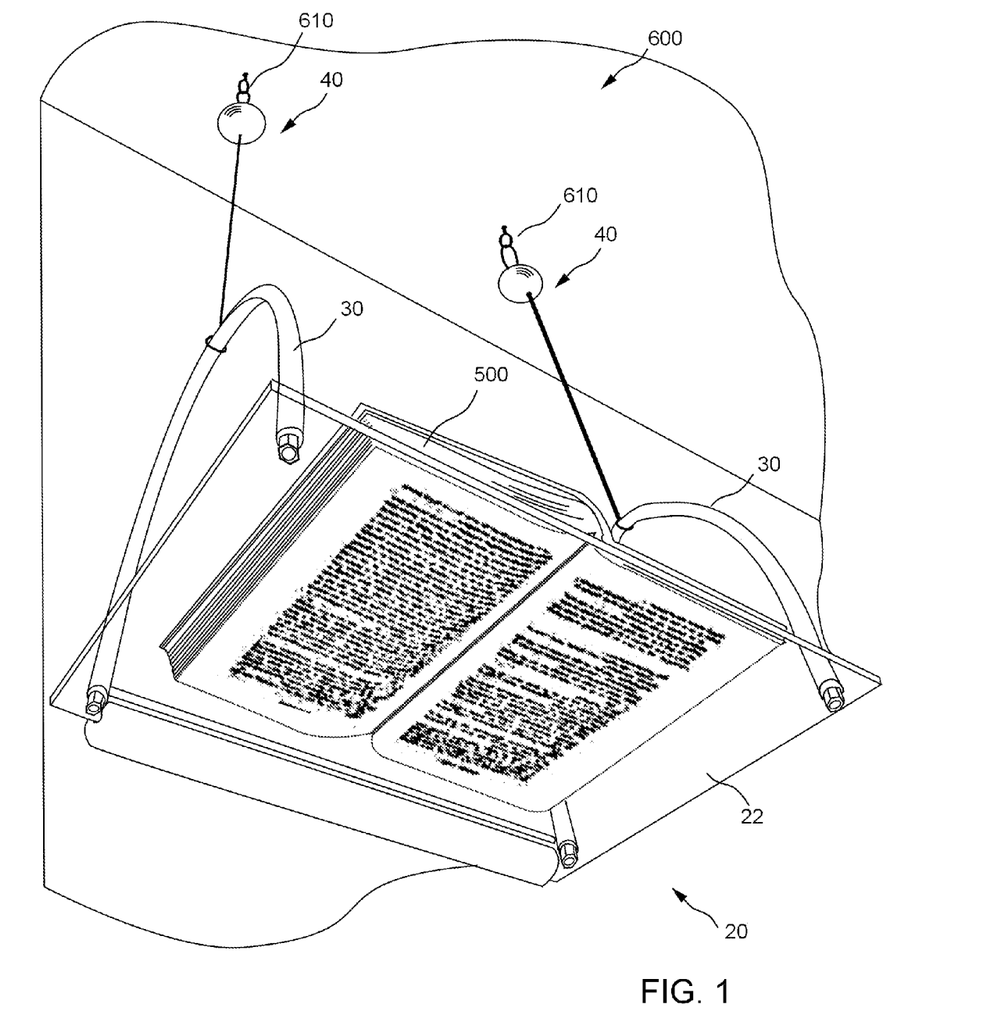
FIG. 1 is perspective view of an overhead support for a visual medium.

Referring initially to FIG. 1, there is illustrated a perspective view of an overhead support for a visual medium 500, the support generally designated as 20. Support 20 includes a transparent support structure 22, on which visual medium 500 is placed with the side to be viewed facing downward. Support 20 is suspended from a ceiling 600 by one or more cooperating anchors 610, enabling a viewer to view medium 500 from a supine position with support 20 suspended overhead.

Visual medium 500 which may be supported by the device includes traditional print media, such as a book, magazine, newspaper, or photograph, as well as electronic devices such as a smartphone, electronic book reader, or lightweight television. Support structure 22 is comprised of a transparent material, such as glass, polymethyl methacrylate (PMMA or acrylic), or other materials well known in the art. In an exemplary embodiment, support structure 22 comprises a ¼ inch thick sheet of PMMA having a 12 inch width and 20 inch length.

Figure 2:
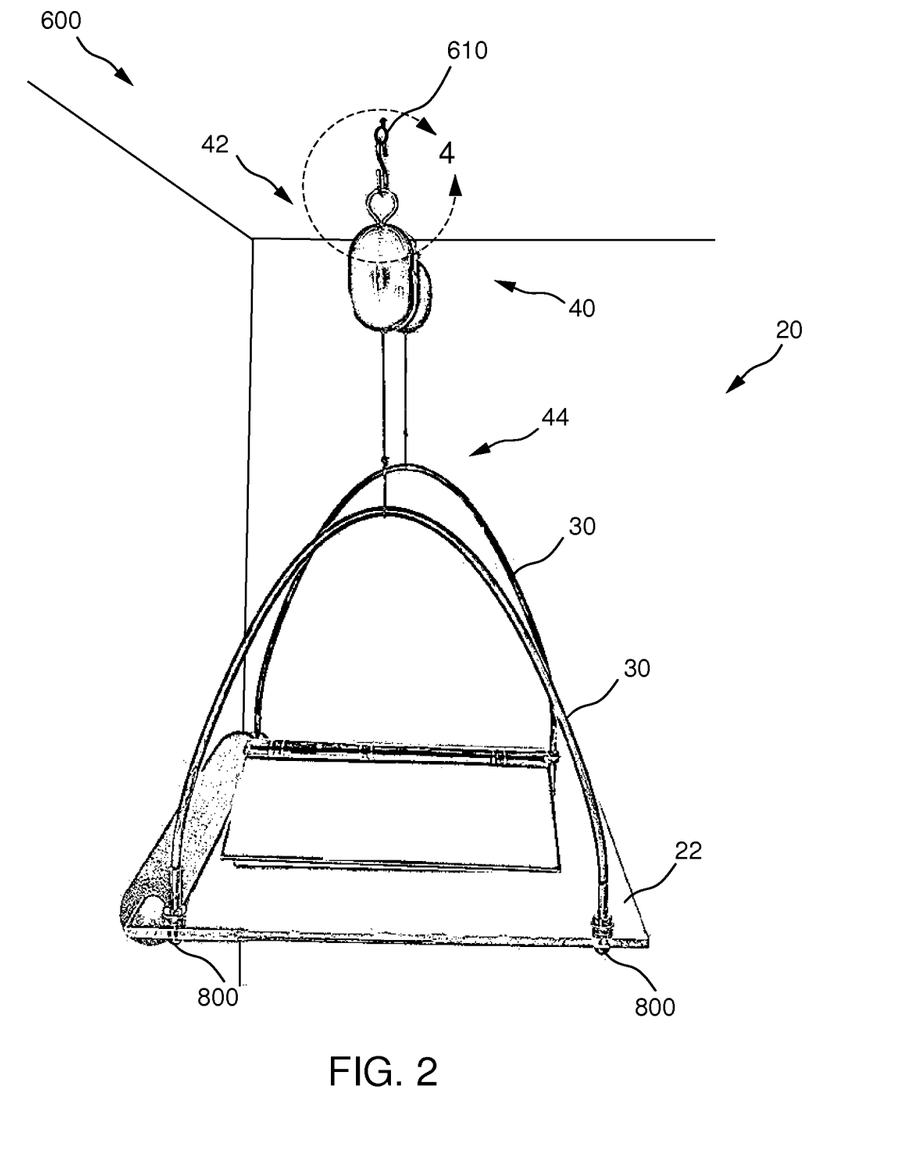
FIG. 2 is a side elevation view of the support.

FIG. 2 is a side elevation view of support 20. At least one upwardly projecting hanger 30 is affixed to support structure 22. The shown embodiment includes two contrapositioned hangers 30, one located near each side of support structure 22, which are U-shaped flexible cables each having two threaded ends. To affix hangers 30 to support structure 22, each threaded end is passed through a hole which is drilled through support structure 22, and is secured by a nut 800.

Other embodiments of hanger 30 include a cord, chain, or rigid member. In an embodiment having one hanger 30, hanger 30 includes multiple contrapositioned points of attachment to structure 22, for improved load balancing.

Figure 3:
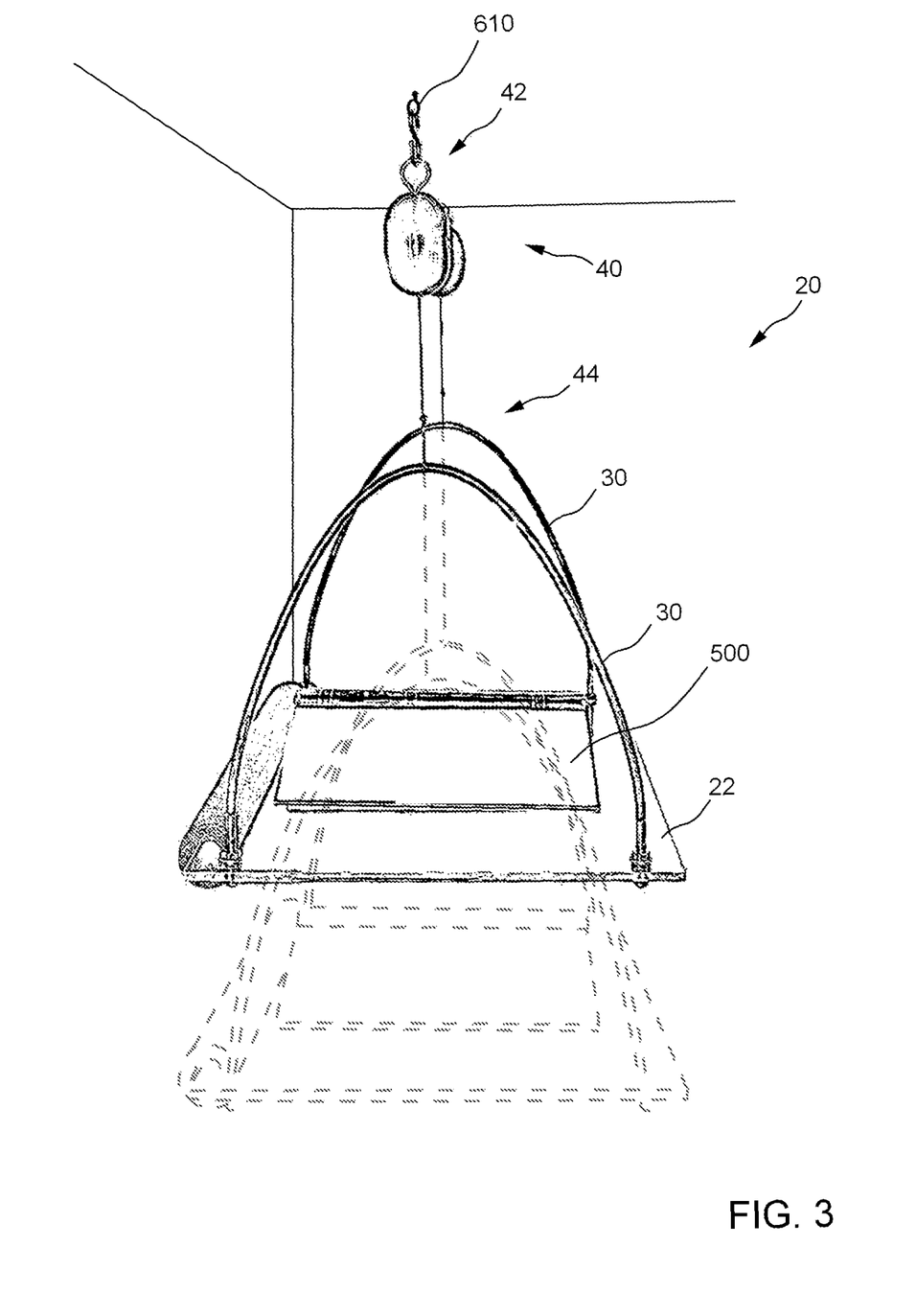
FIG. 3 is a side elevation view of the support in alternate positions.

Support 20 includes a positioning mechanism 40 having a distal end 42 and a proximal end 44. Distal end 42 is connected to anchor 610 and proximal end 44 is connected to hanger 30. Positioning mechanism 40 allows the vertical position (distance from the ceiling) of support structure 22 to be adjusted, enabling viewing from different positions. FIG. 3 is a side elevation view of support 20 in alternate positions.

In the shown embodiment, positioning mechanism 40 is a counterbalancer, such as is commonly used for tool positioning. Positioning mechanism 40 has a retractable nylon cord on proximal end 44. Hanger 30 is connected to proximal end 44 by passing hanger 30 through a loop in the cord. Distal end 42 is connected to anchor 610 by a hook or swivel hanger. The tension of the cable in positioning mechanism 40 is adjustable for varying loads provided by structure 22 and medium 500. The counterbalancer allows support 20 to be easily raised or lowered by hand. Other embodiments of positioning mechanism 40 include retractable pulleys, air-controlled balancers, scissor-type mechanisms, and others well known in the art.

In an embodiment, positioning mechanism 40 has a lock for fixing the height of support structure 22 above the viewer. In a preferred embodiment, the lock is a ratchet mechanism, such as those commonly used in tool positioners or venetian blinds. The lock is released by reducing the load on the mechanism, for example by lifting the support structure upward or pulling it downward. Positioning mechanism 40 therefore enables support 20 to easily be lifted to a higher elevation for purposes such as allowing clearance for the viewer to arise from bed or for storing support 20 out of the way.

In the embodiments of FIGS. 1-3, support 20 includes two positioning mechanisms 40, two hangers 30, and is suspended from two anchors 610. Each positioning mechanism 40 has a distal end 42 connected to one of anchors 610 and a proximal end 44 connected to one of hangers 30. In this arrangement, each positioning mechanism 40 must support only half of the load of structure 22 and medium 500. Since the load on the individual mechanisms 40 is smaller than the total load, smaller (lower weight rating) positioning mechanisms 40 may be used in this configuration. This configuration also provides balance and ease of use. In an embodiment support 20 is rated to support a 30 pound load.

Figure 4:
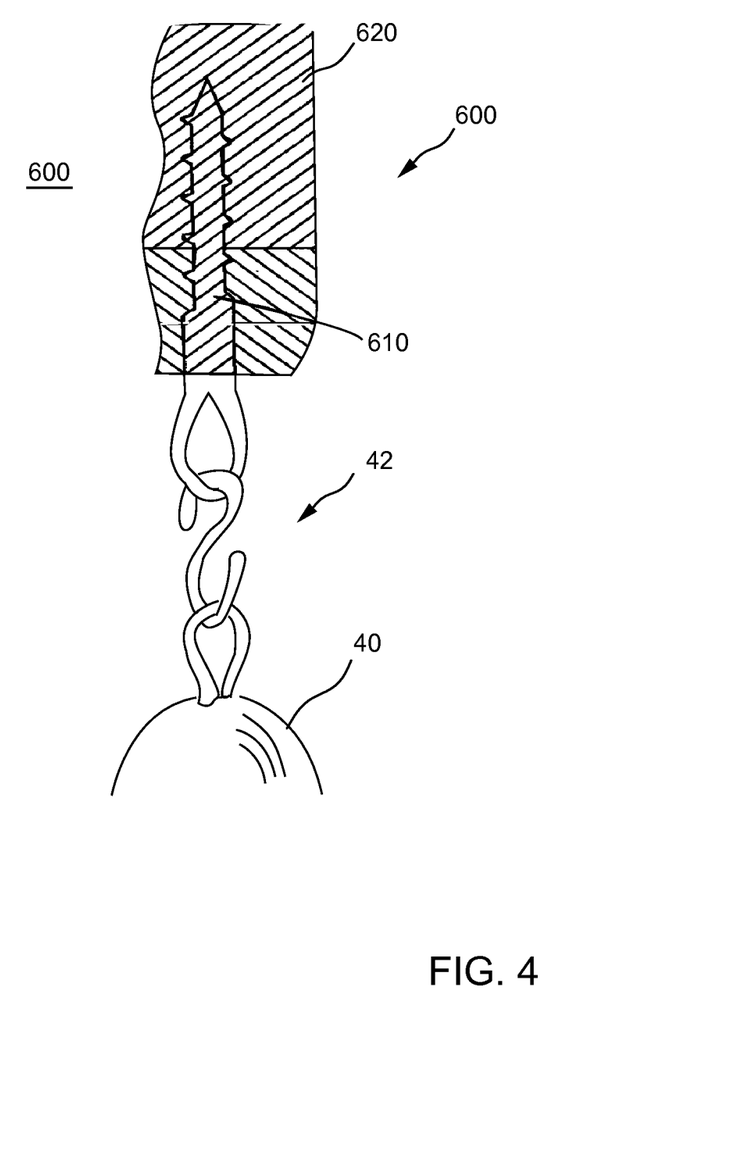
FIG. 4 is an enlarged partial cross-sectional view of the area 4 of FIG. 2.

FIG. 4 is an enlarged partial cross-sectional view of the area 4 of FIG. 2. Anchor 610 is an eyebolt which is screwed directly into a wooden ceiling joist 620 of ceiling 600. Distal end 42 of positioning mechanism 40 is connected to anchor 610 by an S-hook or other simple linkage. In another embodiment, anchor 610 is a toggle anchor which has a toggle that is inserted through a hole in the sheetrock of ceiling 600 and lies flat against the upper face of the sheetrock (inside the ceiling). The toggle anchor allows installations which are not located near a joist, enabling freedom of placement anywhere in the ceiling.

Figure 5:
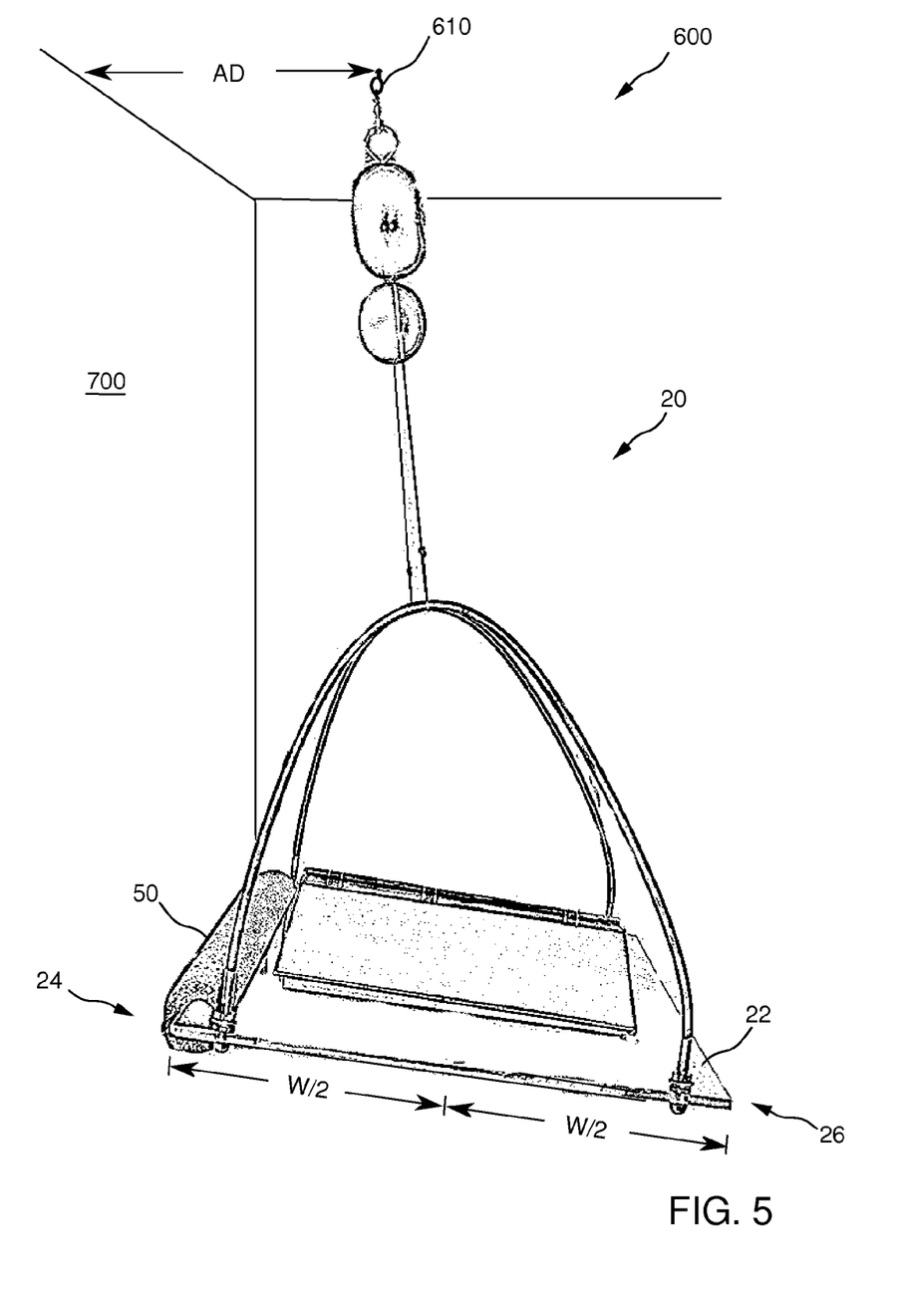
FIG. 5 is a side elevation view of an embodiment of the support.

FIG. 5 is a side elevation view of an embodiment of overhead support 20. Anchor 610 is offset from a wall 700 by an anchor distance AD. Support structure 22 has a width W defined as the distance between a near end 24 (nearest the wall) and an opposing far end 26. Ends 24 and 26 are substantially parallel to wall 700. When anchor distance AD is less than half of width W (or less than W/2), near end 24 contacts wall 700 thereby positioning support 20 at an inclination toward wall 700. For example, if structure 22 has a width of 12 inches (W/2 therefore being 6 inches) and anchor distance AD is 5.5 inches (less than 6 inches), near end 24 will contact wall 700 and support 20 will be positioned with a slight inclination. The inclination of support 20 may be an inclination of support structure 22, as shown in FIG. 5, or positioning mechanism 40 may be inclined at an angle with respect to wall 700 while support structure 22 remains level. A downward inclination of support 20 also directs the reflective glare of an illuminating light source 60 away from the viewer (see FIG. 6). In embodiments where anchor distance AD is greater than W/2 structure 22 does not contact wall 700 and is free-hanging.

In an embodiment a bumper 50, made of foam, rubber, or other cushioning material, is disposed on near end 24. Bumper 50 dampens noise, resists motion of structure 22, and protects wall 700 and structure 22 from contact damage.

Figure 6:
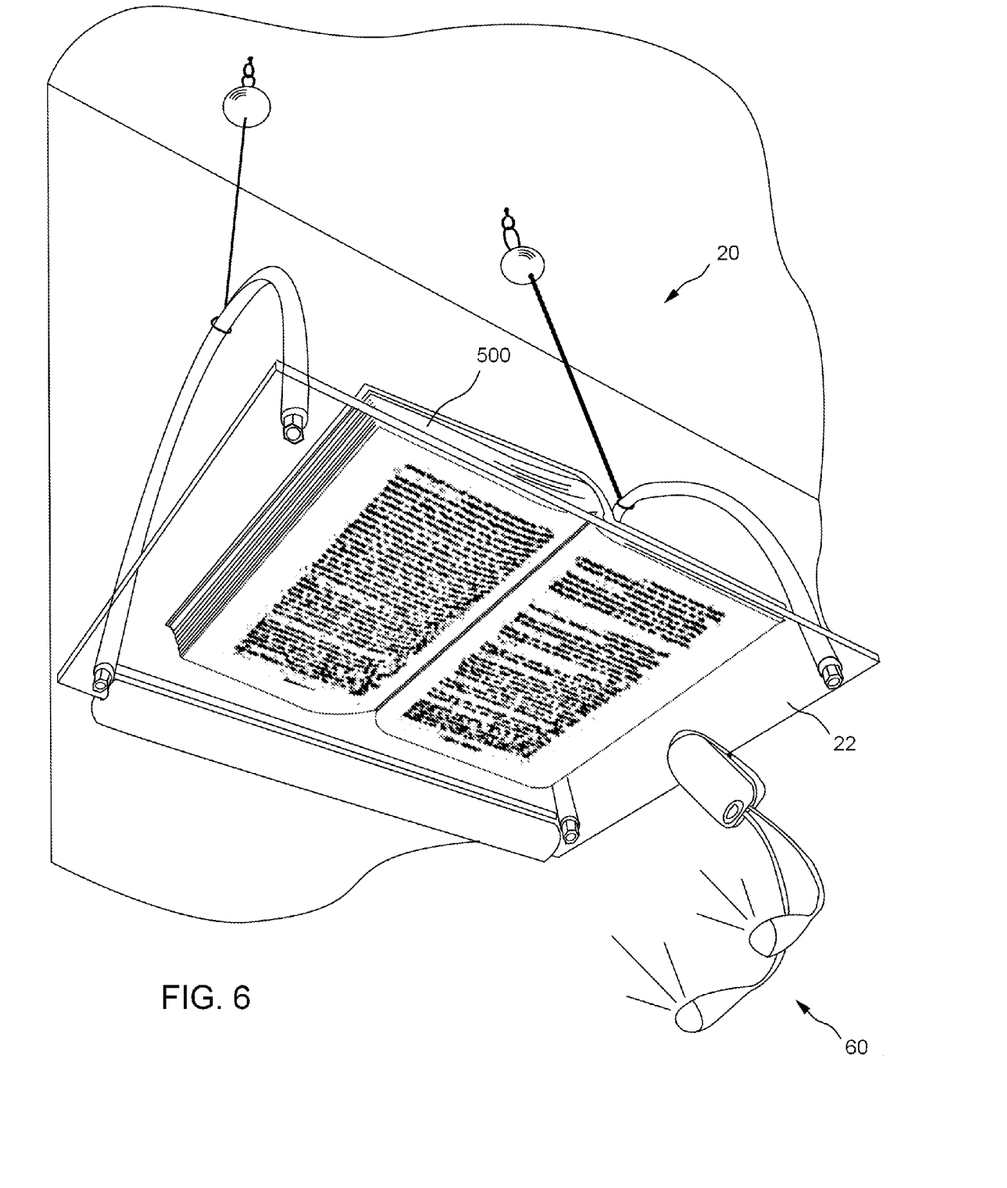
FIG. 6 is perspective view of another embodiment of the support.

FIG. 6 is perspective view of another embodiment of support 20 with a light source 60 affixed to support structure 22 and positioned to illuminate visual medium 500. The light source shown is a clip-on lamp or light emitting diode attached to structure 22 with the light pointing upward to illuminate visual medium 500 through the transparent structure 22.

In another embodiment, at least a portion of support structure 22 has an optical prescription, so that the viewer views a magnified image of the visual medium.

In another embodiment, support 20 cooperates with a wall anchor which grips structure 22 and fixes the height of structure 22. In another embodiment, the wall anchor is a two-pronged plastic fork which structure 22 is snapped into.

In another embodiment, structure 22 is opaque and is used to display images projected on to structure 22. Alternatively, an opaque material is placed on transparent structure 22 when used as a projection screen.

In another embodiment, structure 22 includes a touch-responsive surface. Digital media is displayed on structure 22 and the viewer may interact with an electronic device via structure 22.

In another embodiment, structure 22 is used as a platform and includes hinged legs for use as a serving tray and a hole for supporting a cup.

In another embodiment, structure 22 supports a light source and support 20 is used as an adjustable height chandelier.

In another embodiment, structure 22 includes a page-turning mechanism for use with printed media.

Further provided is a system, wherein support 20 is packaged with anchor 610, nut 800, and all connecting hardware required for a full installation of support 20 in a ceiling 600.

In terms of use, a method for viewing a visual medium includes: (refer to FIGS. 1-6)
  (a) providing a visual medium;
  (b) placing the visual medium on a transparent support structure of an overhead support as described herein;
  (c) adjusting the height of the support to a comfortable viewing distance; and,
  (d) viewing the medium.

When the support is used with a book or other printed media, the viewer must reach up to lift the medium off the structure to turn a page, then lower the medium back to the viewing position. The viewer may also interact via remote control with electronic devices placed on the support.

The embodiments of the overhead support described herein are exemplary and numerous modifications, combinations, variations, and rearrangements can be readily envisioned to achieve an equivalent result, all of which are intended to be embraced within the scope of the appended claims. Further, nothing in the above-provided discussions of the device should be construed as limiting the invention to a particular embodiment or combination of embodiments. The scope of the invention is defined by the appended claims.

I claim:

1. An overhead support for a visual medium, the support enabling a viewer to view the medium from a supine position, the support configured for overhead suspension from a first cooperating anchor and a second cooperating anchor, the support comprising:
   a transparent support structure;
   a first upwardly projecting hanger and a second upwardly projecting hanger where both of said upwardly projecting hangers are contrapositioned, affixed to said support structure, and projecting upwardly in a substantially vertical orientation, and the first and second upwardly projecting hangers are u-shaped;
   only two retractable positioning mechanisms, which are continuously adjustable, each having a distal end and a proximal end, said distal ends each connected to one of the anchors, and said proximal ends each connected to one of said hangers, said positioning mechanisms having a substantially vertical orientation between said distal end and said proximal end; and,
   said positioning mechanisms each having a lock for fixing the height of said support structure above the viewer, said lock being releasable by lifting said support structure upward or pulling said support structure downward, wherein when said support structure is oriented in a first plane and said support structure is lifted upward, both of said two retractable positioning mechanisms at least partially retract and said support structure is raised to be oriented in a second plane substantially parallel to said first plane, and when said support structure is oriented in a second plane and said support structure is pulled downward, both of said two retractable positioning mechanisms at least partially extend and said support structure is lowered to be oriented in a first plane substantially parallel to said second plane, and wherein said positioning mechanisms are configured to retract and to raise said support structure to a variable height.

2. The support according to claim 1, further including:
   a light source affixed to said support structure and positioned to illuminate the visual medium.

3. A system for suspension of a support for a visual medium from an overhead structure, the support enabling a viewer to view the medium from a supine position, the system comprising:
   a transparent support structure;
   at least two upwardly projecting hangers, said hangers being contrapositioned and affixed to said support structure, and projecting upwardly in a substantially vertical orientation, and the first and second upwardly projecting hangers are u-shaped;
   two anchors configured for installation into the overhead structure;
   only two retractable positioning mechanisms, which are continuously adjustable, each having a distal end and a proximal end, said distal ends each connected to one of said anchors, and said proximal ends each connected to one of said hangers, said positioning mechanisms having a substantially vertical orientation between said distal end and said proximal end;
   said positioning mechanisms each having a lock for fixing the height of said support structure above the viewer, said lock being releasable by lifting said support structure upward or pulling said support structure downward, wherein when said support structure is oriented in a first plane and said support structure is lifted upward, both of said two retractable positioning mechanisms at least partially retract and said support structure is raised to be oriented in a second plane substantially parallel to said first plane, and when said support structure is oriented in a second plane and said support structure is pulled downward, both of said two retractable positioning mechanisms at least partially extend and said support structure is lowered to be oriented in a first plane substantially parallel to said second plane, and wherein said positioning mechanisms are configured to retract and to raise said support structure to a variable height; and,
   a light source affixed to said support structure and positioned to illuminate the visual medium.

4. A method for a viewer to view a visual medium, the method including:
   a. providing a visual medium;
   b. providing two anchors affixed in an overhead location with respect to the viewer;
   c. providing a support comprising:
      a transparent support structure;
      a first upwardly projecting hanger and a second upwardly projecting hanger where both of said upwardly projecting hangers are contrapositioned, affixed to said support structure, and projecting upwardly in a substantially vertical orientation, and the first and second upwardly projecting hangers are u-shaped;
      only two retractable positioning mechanisms, which are continuously adjustable, each having a distal end and a proximal end, said distal ends each connected to one of said anchors, and said proximal ends each connected to one of said hangers, said positioning mechanisms having a substantially vertical orientation between said distal end and said proximal end; and,
      said positioning mechanisms each having a lock for fixing the height of said support structure above the viewer, said lock being releasable by lifting said support structure upward or pulling said support structure downward, wherein when said support structure is oriented in a first plane and said support structure is lifted upward, both of said two retractable positioning mechanisms at least partially retract and said support structure is raised to be oriented in a second plane substantially parallel to said first plane, and when said support structure is oriented in a second plane and said support structure is pulled downward, both of said two retractable positioning mechanisms at least partially extend and said support structure is lowered to be oriented in a first plane substantially parallel to said second plane, and wherein said positioning mechanisms are configured to retract and to raise said support structure to a variable height;
   d. placing said visual medium on said transparent support structure;

e. adjusting the height of said support structure to a comfortable viewing distance by lifting said support structure upward or pulling said support structure downward; and,
f. viewing said visual medium.

* * * * *